US010627313B2

(12) United States Patent
Liu et al.

(10) Patent No.: US 10,627,313 B2
(45) Date of Patent: Apr. 21, 2020

(54) DEVICE FOR DETECTING WHEEL HOP

(71) Applicant: CITIC Dicastal CO., LTD, Qinhuangdao (CN)

(72) Inventors: Weidong Liu, Qinhuangdao (CN); Fengyan Liu, Qinhuangdao (CN); Haiping Chang, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 56 days.

(21) Appl. No.: 16/188,564

(22) Filed: Nov. 13, 2018

(65) Prior Publication Data
US 2019/0162630 A1 May 30, 2019

(30) Foreign Application Priority Data
Nov. 30, 2017 (CN) .......................... 2017 1 1235338

(51) Int. Cl.
*G01M 17/013* (2006.01)
*G01B 5/00* (2006.01)
*G01B 5/20* (2006.01)
*G01B 5/14* (2006.01)
*G01B 5/255* (2006.01)

(52) U.S. Cl.
CPC ......... *G01M 17/013* (2013.01); *G01B 5/0004* (2013.01); *G01B 5/0025* (2013.01); *G01B 5/14* (2013.01); *G01B 5/201* (2013.01); *G01B 5/255* (2013.01)

(58) Field of Classification Search
CPC ........ G01M 17/013; G01B 5/20; G01B 5/201

USPC ....................................................... 73/115.07
See application file for complete search history.

(56) References Cited

U.S. PATENT DOCUMENTS

| 3,724,137 | A | * | 4/1973 | Hofelt, Jr. | ............... | B24B 5/366 |
|---|---|---|---|---|---|---|
| | | | | | | 451/254 |
| 3,877,315 | A | * | 4/1975 | Carrigan | ................. | G01M 1/12 |
| | | | | | | 73/459 |
| 3,903,746 | A | * | 9/1975 | Goebel | .................... | G01M 1/12 |
| | | | | | | 73/457 |
| 6,139,401 | A | * | 10/2000 | Dunn | ..................... | B24B 5/366 |
| | | | | | | 451/10 |

(Continued)

FOREIGN PATENT DOCUMENTS

| CN | 104057276 A | 9/2014 |
|---|---|---|
| CN | 105928476 A | 9/2016 |

(Continued)

*Primary Examiner* — Eric S. McCall
(74) *Attorney, Agent, or Firm* — Calfee, Halter & Griswold LLP

(57) ABSTRACT

The present application provides a device for detecting wheel hop, comprising a synchronous clamping and centering mechanism, a synchronous rotating mechanism and a hop detecting mechanism. According to the structure and size of a wheel to be detected, a first servo motor and a second servo motor control the detection wheel in the hop detector to move within a specific plane, the detection wheel is in contact with a bead seat of the wheel, and the synchronous rotating mechanism drives the wheel to rotate; and the detection wheel is driven to rotate by the friction between the detection wheel and a bead seat of the wheel, and the hop detector detects the hop amount of the bead seat of the wheel when the wheel rotates and transmits the data to a computer processing system.

3 Claims, 2 Drawing Sheets

(56) References Cited

U.S. PATENT DOCUMENTS

| | | | |
|---|---|---|---|
| 9,782,866 B1* | 10/2017 | Xue | B24B 9/04 |
| 2016/0207174 A1* | 7/2016 | Liu | B23Q 3/062 |
| 2017/0227414 A1* | 8/2017 | Buzzi | G01M 1/045 |
| 2017/0363405 A1* | 12/2017 | Yang | G01B 3/50 |
| 2018/0001695 A1* | 1/2018 | Liu | B23B 7/12 |
| 2018/0001719 A1* | 1/2018 | Liu | B60C 23/0494 |
| 2018/0003592 A1* | 1/2018 | Liu | G01M 17/013 |
| 2019/0033173 A1* | 1/2019 | Liu | G01M 17/013 |
| 2019/0061020 A1* | 2/2019 | Liu | B23C 3/12 |
| 2019/0061445 A1* | 2/2019 | Liu | B23P 19/10 |
| 2019/0063902 A1* | 2/2019 | Liu | G01B 11/0691 |
| 2019/0224756 A1* | 7/2019 | Liu | B60B 21/12 |
| 2020/0001373 A1* | 1/2020 | Liu | B23B 5/02 |
| 2020/0038895 A1* | 2/2020 | Liu | B05B 12/30 |
| 2020/0041373 A1* | 2/2020 | Buzzi | G01M 1/28 |

FOREIGN PATENT DOCUMENTS

| | | | |
|---|---|---|---|
| CN | 107309462 A | 11/2017 | |
| CN | 107309709 A | 11/2017 | |

\* cited by examiner

DEVICE FOR DETECTING WHEEL HOP

CROSS-REFERENCE TO RELATED APPLICATIONS

This application claims priority to Chinese Patent Application No. 201711235338.5, filed on Nov. 30, 2017, which is hereby incorporated by reference in its entirety.

TECHNICAL FIELD

The present application relates to a detection device, specifically to a device for detecting hop of a wheel bead seat on line after a wheel is machined.

BACKGROUND ART

In the machining of an automobile wheel, the hop amount of the wheel is an important factor affecting the life and safety of the wheel. Therefore, the hop of the wheel requires 100% detection. The wheel hub manufacturer usually uses manual operation semi-automatic hop detection equipment for detection. Such detection method has the problems of low efficiency, high labor cost, poor universality and the like.

SUMMARY OF THE INVENTION

The object of the present application to provide a hop detecting device, that is, a device for detecting hop of a wheel on line.

In order to achieve the above object, the technical solution of the present application is: a hop detecting device according to the present application is composed of a first synchronous pulley, a dynamic synchronous pulley, a synchronous belt, a second synchronous pulley, a frame, a base, a first guide rail sliding seat, a first linear guide rail, a connecting plate, a rotating motor, a guide rail rack, a detection wheel, a hop detector, a second linear guide rail, a second guide rail sliding seat, a second servo motor, a second lead screw, a third linear guide rail, a mounting bracket, a first servo motor, a third guide rail sliding seat, a first lead screw, a sliding rack, a roller, a roller bed sprocket, a roller bed bracket, a power sprocket, a roller bed motor, four rotating wheels, rotating shafts, an end cover, a bearing, a shaft sleeve, lead screw supports, left and right threaded lead screws, lead screw cap, a cylinder connecting plate, a cylinder seat, a cylinder flange and a cylinder. The hop detecting device also comprises a synchronous clamping and centering mechanism, a synchronous rotating mechanism and a hop detecting mechanism.

I. The synchronous clamping and centering mechanism: the cylinder seat is fixed on the side of the frame, the cylinder is fixed on the frame via the cylinder flange and the cylinder seat, and an output rod of the cylinder is connected to the cylinder connecting plate; the base is fixed on the frame, the first linear guide rail is mounted on the base, and the first linear guide rail is connected with the connecting plate via the first guide rail sliding seat; the lead screw supports are fixed on the frame, the two lead screw caps are respectively fixed to the connecting plate on the left and right sides, and the left and right threaded lead screws are connected to the lead screw caps and the lead screw supports respectively.

After the cylinder is charged with air, an output shaft of the cylinder drives a right driven rotating portion to move toward the middle along the first linear guide rail via the first guide rail sliding seat and the first linear guide rail. Meanwhile, the left and right threaded lead screws begin to rotate. Under the co-action of the left and right threaded lead screws and the lead screw caps on the left and right sides, a left driving rotating portion moves toward the middle along the first linear guide rail, and the four rotating wheels on the left and right rotating portions are synchronously centered toward the central positions of the four rotating shafts, and clamp the rim of a wheel, thus realizing synchronous clamping and centering of the wheel. The device may meet the requirements for synchronous clamping and centering of wheels having different sizes.

II. The synchronous rotating mechanism: the rotating motor and the shaft sleeve are mounted on the connecting plate, the end cover is mounted on the shaft sleeve, the bearings and the rotating shafts are enclosed inside the shaft sleeve and the connecting plate, two of the four rotating wheels and the first synchronous pulley or the second synchronous pulley are mounted at each of the two ends of the rotating shafts, the dynamic synchronous pulley is mounted on the rotating motor shaft, and the first synchronous pulley, the second synchronous pulley and the dynamic synchronous pulley are connected via the synchronous belt; the roller bed bracket is fixed on the frame, the roller is connected with the roller bed bracket via the roller bed sprocket, the roller bed motor is fixed on the roller bed bracket, and the power sprocket is mounted on the roller bed motor.

The rotating motor drives the first synchronous pulley and the second synchronous pulley to rotate via the dynamic synchronous pulley and the synchronous belt, the rotating wheels are driven by the rotating shafts to rotate, the rim of the wheel is in contact fit with the rotating wheels after the wheel is centered via the synchronous clamping and centering mechanism, and the two synchronous rotating wheels on the left side drive the wheel to rotate.

III. The hop detecting mechanism: the first servo motor and the second linear guide rail are fixed on the frame via the guide rail rack, the sliding rack is connected with the second linear guide rail via the second guide rail sliding seat, the first lead screw is connected with the first servo motor and the sliding rack respectively, and the first servo motor drives the sliding rack to move up and down along the second linear guide rail via the first lead screw.

The second servo motor and the third linear guide rail are fixed on the sliding rack, the mounting bracket is connected with the third linear guide rail via the third guide rail sliding seat, the second lead screw is connected with the second servo motor and the mounting bracket respectively, and the second servo motor drives the mounting bracket to move horizontally along the third linear guide rail via the second lead screw.

The detection wheel and the hop detector are mounted on the mounting bracket.

In one aspect, the present application provides A device for detecting wheel hop, comprises a first synchronous pulley, a dynamic synchronous pulley, a synchronous belt, a second synchronous pulley, a frame, a base, a first guide rail sliding seat, a first linear guide rail, a connecting plate, a rotating motor, a guide rail rack, a detection wheel, a hop detector, a second linear guide rail, a second guide rail sliding seat, a second servo motor, a second lead screw, a third linear guide rail, a mounting bracket, a first servo motor, a third guide rail sliding seat, a first lead screw, a sliding rack, a roller, a roller bed sprocket, a roller bed bracket, a power sprocket, a roller bed motor, four rotating wheels, rotating shafts, an end cover, a bearing, a shaft sleeve, lead screw supports, left and right threaded lead screws, lead screw caps, a cylinder connecting plate, a cylinder seat, a cylinder flange and a cylinder, wherein that the device also comprises a synchronous clamping and centering mechanism, a synchronous rotating mechanism and a hop detecting mechanism; in the synchronous clamping and centering mechanism of the device, the cylinder seat is fixed on the side of the frame, the cylinder is fixed on the frame via the cylinder flange and the cylinder seat, and an output rod of the cylinder is connected to the cylinder connecting plate; the base is fixed on the frame, the first linear guide rail is mounted on the base, and the first linear guide rail is connected with the connecting plate via the first guide rail sliding seat; the lead screw supports are fixed on the frame, the two lead screw caps are respectively fixed to the connecting plate on the left and right sides, and the left and right threaded lead screws are connected to the lead screw caps and the lead screw supports respectively; in the synchronous rotating mechanism of the device, the rotating motor and the shaft sleeve are mounted on the connecting plate, the end cover is mounted on the shaft sleeve, the bearings and the rotating shafts are enclosed inside the shaft sleeve and the connecting plate, two of the four rotating wheels and the first synchronous pulley or the second synchronous pulley are mounted at each of the two ends of the rotating shafts, the dynamic synchronous pulley is mounted on the rotating motor shaft, and the first synchronous pulley, the second synchronous pulley and the dynamic synchronous pulley are connected via the synchronous belt; the roller bed bracket is fixed on the frame, the roller is connected with the roller bed bracket via the roller bed sprocket, the roller bed motor is fixed on the roller bed bracket, and the power sprocket is mounted on the roller bed motor; in the hop detection mechanism of the device, the first servo motor and the second linear guide rail are fixed on the frame via the guide rail rack, the sliding rack is connected with the second linear guide rail via the second guide rail sliding seat, the first lead screw is connected with the first servo motor and the sliding rack respectively, and the first servo motor drives the sliding rack to move up and down along the second linear guide rail via the first lead screw; the second servo motor and the third linear guide rail are fixed on the sliding rack, the mounting bracket is connected with the third linear guide rail via the third guide rail sliding seat, the second lead screw is connected with the second servo motor and the mounting bracket respectively, and the second servo motor drives the mounting bracket to move horizontally along the third linear guide rail via the second lead screw; the detection wheel and the hop detector are mounted on the mounting bracket; according to the structure and size of the wheel to be detected, through the first servo motor and the second servo motor, the detection wheel in the hop detector is controlled to move within a specific plane, the detection wheel is in contact with a bead seat of the wheel, and the synchronous rotating mechanism drives the wheel to rotate; and the detection wheel is driven to rotate by the friction between the detection wheel and the bead seat of the wheel, and the hop detector detects the hop amount of the bead seat of the wheel when the wheel rotates and transmits the data to a computer processing system.

In a preferred aspect of the present application, the synchronous clamping and centering mechanism of the device is configured as following: after the cylinder is charged with air, an output shaft of the cylinder drives a right driven rotating portion to move toward the middle along the first linear guide rail via the first guide rail sliding seat and the first linear guide rail; meanwhile, the left and right threaded lead screws begin to rotate; under the co-action of the left and right threaded lead screws and the lead screw caps on the left and right sides, a left driving rotating portion moves toward the middle along the first linear guide rail, and the four rotating wheels on the left and right rotating portions are synchronously centered toward the central positions of the four rotating shafts and clamp the rim of a wheel, thus realizing synchronous clamping and centering of the wheel.

In a preferred aspect of the present application, the synchronous rotating mechanism of the device is configured as following: the rotating motor drives the first synchronous pulley and the second synchronous pulley to rotate via the dynamic synchronous pulley and the synchronous belt, the rotating wheels are driven by the rotating shafts to rotate, the rim of the wheel is in contact fit with the rotating wheels after the wheel is centered via the synchronous clamping and centering mechanism, and the two synchronous rotating wheels on the left side drive the wheel to rotate.

In actual use, a wheel is transported to the working position of the device via a roller bed, compressed air is introduced, and the cylinder drives the right driving rotating portion to move toward the middle along the first linear guide rail via the first guide rail sliding seat and the first linear guide rail. Meanwhile, the left and right threaded lead screws begin to rotate. Under the co-action of the left and right threaded lead screws and the lead screw caps on the left and right sides, the left driven rotating portion moves toward the middle along the first linear guide rail, and the four rotating wheels on the left and right rotating portions are synchronously centered toward the central positions of the four rotating shafts and clamp the rim of the wheel. Thus, the wheel is synchronously clamped and centered. Then, the rotating motor drives the first synchronous pulley and the second synchronous pulley to rotate via the dynamic synchronous pulley and the synchronous belt, the rotating wheels are driven by the rotating shafts to rotate, and the rim of the wheel is in contact fit with the rotating wheels after the wheel is centered via the synchronous clamping and centering mechanism. According to the structure and size of the wheel to be detected, through the first servo motor and the second servo motor, the detection wheel in the hop detector may be controlled to move within a specific plane, and the detection wheel is in contact with the bead seat of the wheel. Next, the two synchronous rotating wheels on the right side of the synchronous rotating mechanism drive the wheel to rotate. Meanwhile, the detection wheel is driven to rotate by the friction between the detection wheel and the bead seat of the wheel, and once the wheel rotates one cycle, the hop detector may detect the hop amount of the bead seat of the wheel and transmit the data to a computer processing system. So far, the hop detection on the wheel is completed.

The present application may meet the requirements for wheel hop detecting. Meanwhile the hop detecting device has simple structure, easy operation, stable property. The precision of the hop detecting device may meet processing requirement, and meet the need of the automation production.

BRIEF DESCRIPTION OF DRAWINGS

The embodiments of the present application will be described in detail below in combination with the accompanying drawings, in which.

Figure 1:
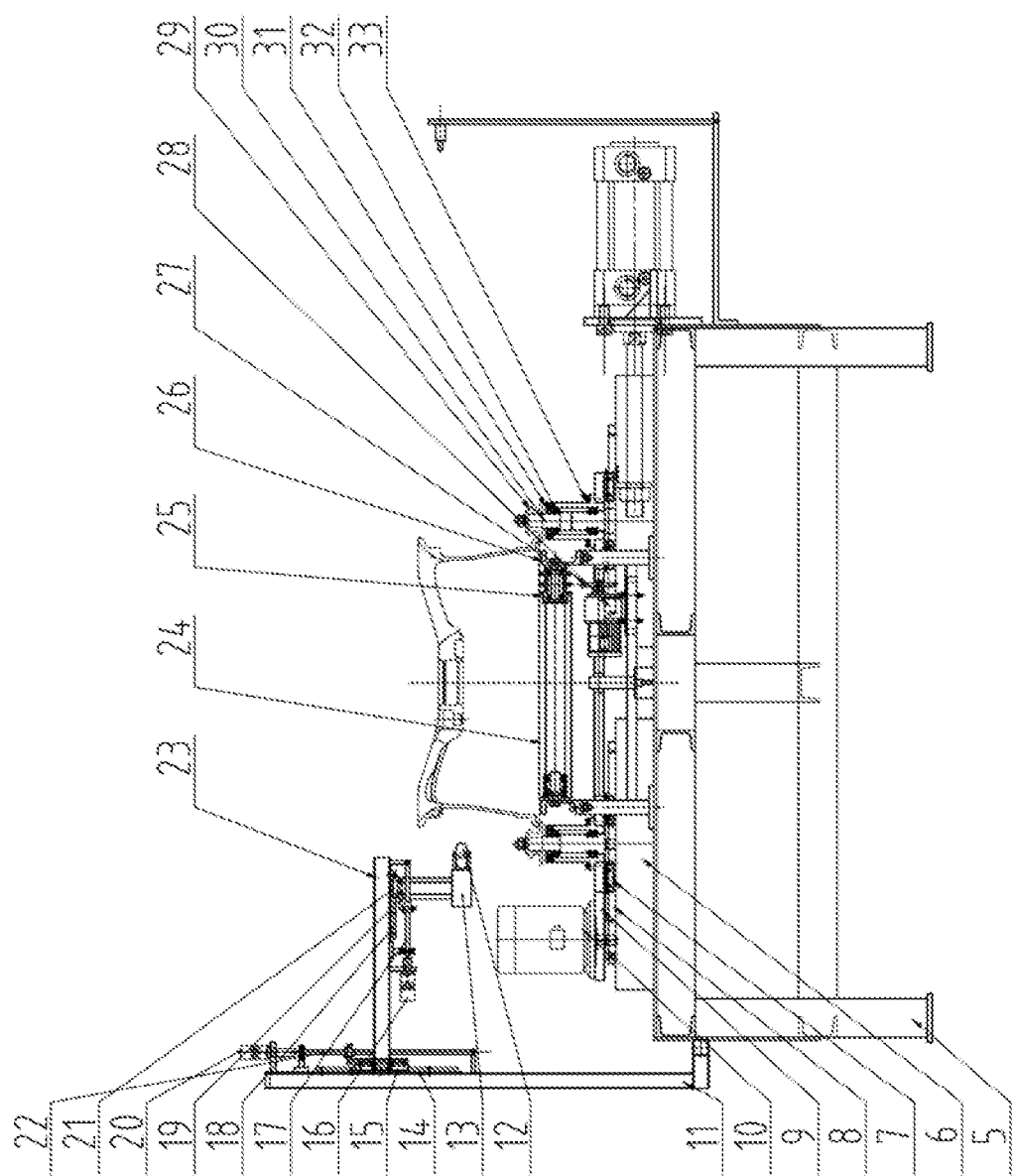
FIG. 1 is a structure diagram of a device according to the present application.
Figure 2:
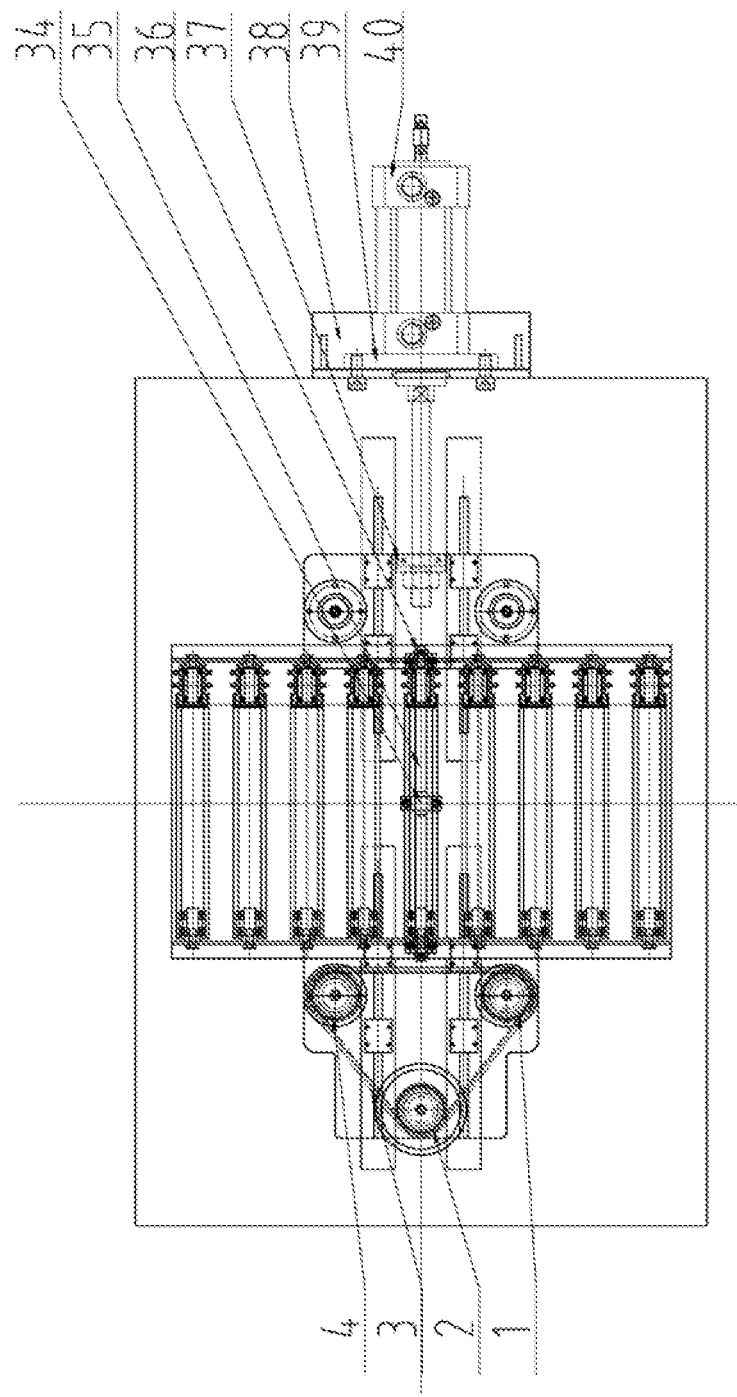
FIG. 2 is a top view of the device according to the present application.

In figures, 1—first synchronous pulley, 2—dynamic synchronous pulley, 3—synchronous belt, 4—second synchronous pulley, 5—frame, 6—base, 7—first guide rail sliding seat, 8—first linear guide rail, 9—connecting plate, 10—rotating motor, 11—guide rail rack, 12—detection wheel, 13—hop detector, 14—second linear guide rail, 15—second guide rail sliding seat, 16—second servo motor, 17—second lead screw, 18—third linear guide rail, 19—mounting bracket, 20—first servo motor, 21—third guide rail sliding seat, 22—first lead screw, 23—sliding rack, 24—roller, 25—roller bed sprocket, 26—roller bed bracket, 27—power sprocket, 28—roller bed motor, 29—rotating wheel, 30—rotating shaft, 31—end cover, 32—bearing, 33—shaft sleeve, 34—lead screw support, 35—left and right threaded lead screw, 36—lead screw cap, 37—cylinder connecting plate, 38—cylinder seat, 39—cylinder flange, 40—cylinder.

DETAILED DESCRIPTION OF THE INVENTION

Embodiment 1

The details and working conditions of the specific device according to the present application will be described in detail below in combination with the accompanying drawings.

A hop detecting device according to the present application is composed of a first synchronous pulley 1, a dynamic synchronous pulley 2, a synchronous pulley 3, a second synchronous pulley 4, a frame 5, a base 6, a first guide rail sliding seat 7, a first linear guide rail 8, a connecting plate 9, a rotating motor 10, a guide rail rack 11, a detection wheel 12, a hop detector 13, a second linear guide rail 14, a second guide rail sliding seat 15, a second servo motor 16, a second lead screw 17, a third linear guide rail 18, a mounting bracket 19, a first servo motor 20, a third guide rail sliding seat 21, a first lead screw 22, a sliding rack 23, a roller 24, a roller bed sprocket 25, a roller bed bracket 26, a power sprocket 27, a roller bed motor 28, four rotating wheels 29, rotating shafts 30, an end cover 31, a bearing 32, a shaft sleeve 33, lead screw supports 34, left and right threaded lead screws 35, lead screw cap 36, a cylinder connecting plate 37, a cylinder seat 38, a cylinder flange 39 and a cylinder 40. The hop detecting device also comprising a synchronous clamping and centering mechanism, a synchronous rotating mechanism and a hop detecting mechanism.

I. The synchronous clamping and centering mechanism: the cylinder seat 38 is fixed on the side of the frame 5, the cylinder 40 is fixed on the frame 5 via the cylinder flange 43 and the cylinder seat 38, and an output rod of the cylinder 40 is connected to the cylinder connecting plate 37; the base 6 is fixed on the frame 5, the first linear guide rail 8 is mounted on the base 6, and the first linear guide rail 8 is connected with the connecting plate 9 via the first guide rail sliding seat 7; the lead screw supports 34 are fixed on the frame 5, the two lead screw caps 36 are respectively fixed to the connecting plate 9 on the left and right sides, and the left and right threaded lead screws 35 are connected to the lead screw caps 36 and the lead screw supports 34 respectively.

After the cylinder 40 is charged with air, an output shaft of the cylinder 40 drives a right driven rotating portion to move toward the middle along the first linear guide rail 8 via the first guide rail sliding seat 7 and the first linear guide rail 8. Meanwhile, the left and right threaded lead screws 35 begin to rotate. Under the co-action of the left and right threaded lead screws 35 and the lead screw caps 36 on the left and right sides, a left driving rotating portion moves toward the middle along the first linear guide rail 8, and the four rotating wheels 29 on the left and right rotating portions are synchronously centered toward the central positions of the four rotating shafts 30, and clamp the rim of a wheel, thus realizing synchronous clamping and centering of the wheel. The device may meet the requirements for synchronous clamping and centering of wheels having different sizes.

II. The synchronous rotating mechanism: the rotating motor 10 and the shaft sleeve 33 are mounted on the connecting plate 9, the end cover 31 is mounted on the shaft sleeve 33, the bearings 32 and the rotating shafts 30 are enclosed inside the shaft sleeve 33 and the connecting plate 9, two of the four rotating wheels 29 and the first synchronous pulley 1 or the second synchronous pulley 4 are mounted at each of the two ends of the rotating shafts 30, the dynamic synchronous pulley 2 is mounted on the rotating motor shaft 10, and the first synchronous pulley 1, the second synchronous pulley 4 and the dynamic synchronous pulley 2 are connected via the synchronous belt 3; the roller bed bracket 26 is fixed on the frame 5, the roller 24 is connected with the roller bed bracket 26 via the roller bed sprocket 25, the roller bed motor 28 is fixed on the roller bed bracket 26, and the power sprocket 27 is mounted on the roller bed motor 28.

The rotating motor 10 drives the first synchronous pulley 1 and the second synchronous pulley 4 to rotate via the dynamic synchronous pulley 2 and the synchronous belt 3, the rotating wheels 29 are driven by the rotating shafts 30 to rotate, the rim of the wheel is in contact fit with the rotating wheels 29 after the wheel is centered via the synchronous clamping and centering mechanism, and the two synchronous rotating wheels 29 on the left side drive the wheel to rotate.

III. The hop detecting mechanism: the first servo motor 20 and the second linear guide rail 14 are fixed on the frame 5 via the guide rail rack 11, the sliding rack 23 is connected with the second linear guide rail 14 via the second guide rail sliding seat 15, the first lead screw 22 is connected with the first servo motor 20 and the sliding rack 23 respectively, and the first servo motor 20 drives the sliding rack 23 to move up and down along the second linear guide rail 14 via the first lead screw 22.

The second servo motor 16 and the third linear guide rail 18 are fixed on the sliding rack 23, the mounting bracket 19 is connected with the third linear guide rail 18 via the third guide rail sliding seat 21, the second lead screw 17 is connected with the second servo motor 16 and the mounting bracket 19 respectively, and the second servo motor 16 drives the mounting bracket 19 to move horizontally along the third linear guide rail 18 via the second lead screw 17.

The detection wheel 12 and the hop detector 13 are mounted on the mounting bracket 19.

In actual use, a wheel is transported to the working position of the device via a roller bed, compressed air is introduced, and the cylinder 40 drives the right driving rotating portion to move toward the middle along the first linear guide rail 8 via the first guide rail sliding seat 7 and the first linear guide rail 8. Meanwhile, the left and right threaded lead screws 35 begin to rotate. Under the co-action of the left and right threaded lead screws 35 and the lead screw caps 36 on the left and right sides, the left driven rotating portion moves toward the middle along the first linear guide rail 8, and the four rotating wheels 29 on the left and right rotating portions are synchronously centered toward the central positions of the four rotating shafts 30 and clamp the rim of the wheel. Thus, the wheel is synchronously clamped and centered. Then, the rotating motor 10 drives the first synchronous pulley 1 and the second synchronous pulley 4 to rotate via the dynamic synchronous pulley 2 and the synchronous belt 3, the rotating wheels 29 are driven by the rotating shafts 30 to rotate, and the rim of the wheel is in contact fit with the rotating wheels 29 after the wheel is centered via the synchronous clamping and centering mechanism. According to the structure and size of the wheel to be detected, through the first servo motor 20 and the second servo motor 16, the detection wheel 12 in the hop detector 13 may be controlled to move within a specific plane, and the detection wheel 12 is in contact with the bead seat of the wheel. Next, the two synchronous rotating wheels 29 on the right side of the synchronous rotating mechanism drive the wheel to rotate. Meanwhile, the detection wheel 12 is driven to rotate by the friction between the detection wheel 12 and the bead seat of the wheel, and once the wheel rotates one cycle, the hop detector 13 may detect the hop amount of the bead seat of the wheel and transmit the data to a computer processing system. So far, the hop detection on the wheel is completed.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for detecting wheel hop, comprising a first synchronous pulley, a dynamic synchronous pulley, a synchronous belt, a second synchronous pulley, a frame, a base, a first guide rail sliding seat, a first linear guide rail, a connecting plate, a rotating motor, a guide rail rack, a detection wheel, a hop detector, a second linear guide rail, a second guide rail sliding seat, a second servo motor, a second lead screw, a third linear guide rail, a mounting bracket, a first servo motor, a third guide rail sliding seat, a first lead screw, a sliding rack, a roller, a roller bed sprocket, a roller bed bracket, a power sprocket, a roller bed motor, four rotating wheels, rotating shafts, an end cover, a bearing, a shaft sleeve, lead screw supports, left and right threaded lead screws, lead screw caps, a cylinder connecting plate, a cylinder seat, a cylinder flange and a cylinder, wherein that the device also comprising a synchronous clamping and centering mechanism, a synchronous rotating mechanism and a hop detecting mechanism;

in the synchronous clamping and centering mechanism of the device, the cylinder seat is fixed on the side of the frame, the cylinder is fixed on the frame via the cylinder flange and the cylinder seat, and an output rod of the cylinder is connected to the cylinder connecting plate; the base is fixed on the frame, the first linear guide rail is mounted on the base, and the first linear guide rail is connected with the connecting plate via the first guide rail sliding seat; the lead screw supports are fixed on the frame, the two lead screw caps are respectively fixed to the connecting plate on the left and right sides, and the left and right threaded lead screws are connected to the lead screw caps and the lead screw supports respectively;

in the synchronous rotating mechanism of the device, the rotating motor and the shaft sleeve are mounted on the connecting plate, the end cover is mounted on the shaft sleeve, the bearings and the rotating shafts are enclosed inside the shaft sleeve and the connecting plate, two of the four rotating wheels and the first synchronous pulley or the second synchronous pulley are mounted at each of the two ends of the rotating shafts, the dynamic synchronous pulley is mounted on the rotating motor shaft, and the first synchronous pulley, the second synchronous pulley and the dynamic synchronous pulley are connected via the synchronous belt; the roller bed bracket is fixed on the frame, the roller is connected with the roller bed bracket via the roller bed sprocket, the roller bed motor is fixed on the roller bed bracket, and the power sprocket is mounted on the roller bed motor;

in the hop detection mechanism of the device, the first servo motor and the second linear guide rail are fixed on the frame via the guide rail rack, the sliding rack is connected with the second linear guide rail via the second guide rail sliding seat, the first lead screw is connected with the first servo motor and the sliding rack respectively, and the first servo motor drives the sliding rack to move up and down along the second linear guide rail via the first lead screw;

the second servo motor and the third linear guide rail are fixed on the sliding rack, the mounting bracket is connected with the third linear guide rail via the third guide rail sliding seat, the second lead screw is connected with the second servo motor and the mounting bracket respectively, and the second servo motor drives the mounting bracket to move horizontally along the third linear guide rail via the second lead screw;

the detection wheel and the hop detector are mounted on the mounting bracket; according to the structure and size of the wheel to be detected, through the first servo motor and the second servo motor, the detection wheel in the hop detector is controlled to move within a specific plane, the detection wheel is in contact with a bead seat of the wheel, and the synchronous rotating mechanism drives the wheel to rotate; and the detection wheel is driven to rotate by the friction between the detection wheel and the bead seat of the wheel, and the hop detector detects the hop amount of the bead seat of the wheel when the wheel rotates and transmits the data to a computer processing system.

2. The device according to claim 1, wherein that the synchronous clamping and centering mechanism of the device is configured as following: after the cylinder is charged with air, an output shaft of the cylinder drives a right driven rotating portion to move toward the middle along the first linear guide rail via the first guide rail sliding seat and the first linear guide rail; meanwhile, the left and right threaded lead screws begin to rotate; under the co-action of the left and right threaded lead screws and the lead screw caps on the left and right sides, a left driving rotating portion moves toward the middle along the first linear guide rail, and the four rotating wheels on the left and right rotating portions are synchronously centered toward the central positions of the four rotating shafts and clamp the rim of a wheel, thus realizing synchronous clamping and centering of the wheel.

3. The device according to claim 1, wherein that the synchronous rotating mechanism of the device is configured as following: the rotating motor drives the first synchronous pulley and the second synchronous pulley to rotate via the dynamic synchronous pulley and the synchronous belt, the rotating wheels are driven by the rotating shafts to rotate, the rim of the wheel is in contact fit with the rotating wheels after the wheel is centered via the synchronous clamping and centering mechanism, and the two synchronous rotating wheels on the left side drive the wheel to rotate.

* * * * *